US011926294B2

(12) United States Patent
Mueller et al.

(10) Patent No.: US 11,926,294 B2
(45) Date of Patent: Mar. 12, 2024

(54) RELAY VALVE MODULE FOR USE AS AN AXLE MODULATOR AND TRAILER CONTROL MODULE

(71) Applicant: ZF CV Systems Hannover GmbH, Hannover (DE)

(72) Inventors: Thomas Mueller, Hannover (DE); Robert Otremba, Ronnenberg (DE); Julian Van Thiel, Grossburgwedel (DE); Gerd Roters, Wunstorf (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 481 days.

(21) Appl. No.: 17/197,112

(22) Filed: Mar. 10, 2021

(65) Prior Publication Data

US 2021/0197780 A1 Jul. 1, 2021

Related U.S. Application Data

(63) Continuation of application No. PCT/EP2019/071945, filed on Aug. 15, 2019.

(30) Foreign Application Priority Data

Sep. 12, 2018 (DE) ...................... 10 2018 122 193.2

(51) Int. Cl.
*B60T 13/22* (2006.01)
*B60T 8/17* (2006.01)
(Continued)

(52) U.S. Cl.
CPC .......... *B60T 13/683* (2013.01); *B60T 8/1708* (2013.01); *B60T 8/171* (2013.01); *B60T 8/176* (2013.01);
(Continued)

(58) Field of Classification Search
CPC .... B60T 13/268; B60T 13/683; B60T 8/1708; B60T 8/171; B60T 8/176; B60T 2270/10; B60T 2270/88
(Continued)

(56) References Cited

U.S. PATENT DOCUMENTS 11,440,521 B2 * 9/2022 Van Thiel ............. B60T 15/043
2009/0057072 A1 3/2009 Wood et al.
(Continued)

FOREIGN PATENT DOCUMENTS

CN  101263032 A  9/2008
CN  101508288 A  8/2009
(Continued)

*Primary Examiner* — Christopher P Schwartz
(74) *Attorney, Agent, or Firm* — LEYDIG, VOIT & MAYER, LTD.

(57) ABSTRACT

A relay valve module for an electronically controllable pneumatic brake system for actuating wheel brakes of a utility vehicle includes: a reservoir connection for receiving a reservoir pressure; a brake control pressure connection for receiving a brake control pressure; at least one first service brake connection for outputting a service brake pressure; a relay valve with a relay valve reservoir connection, which is connected to the reservoir connection, a relay valve working connection, which is connected to the first service brake connection, a relay valve ventilation connection, and a relay valve control connection; an electropneumatic pilot control unit, which is connected to the reservoir connection, the electropneumatic pilot control unit providing a pilot control pressure; and a shuttle valve with a first shuttle valve inlet, a second shuttle valve inlet, and a shuttle valve outlet. The first shuttle valve inlet is connected to the brake control pressure connection.

16 Claims, 5 Drawing Sheets

(51) Int. Cl.
*B60T 8/171* (2006.01)
*B60T 8/176* (2006.01)
*B60T 13/26* (2006.01)
*B60T 13/68* (2006.01)

(52) U.S. Cl.
CPC ......... *B60T 13/268* (2013.01); *B60T 2270/10* (2013.01); *B60T 2270/88* (2013.01)

(58) Field of Classification Search
USPC .................................. 303/54, 123, 127, 128
See application file for complete search history.

(56) References Cited

U.S. PATENT DOCUMENTS

| | | | |
|---|---|---|---|
| 2011/0147141 A1* | 6/2011 | Schnittger | B60T 13/683 137/488 |
| 2016/0332608 A1 | 11/2016 | Kiel | |
| 2017/0036654 A1 | 2/2017 | Füllgrabe et al. | |
| 2017/0217412 A1 | 8/2017 | Knoke et al. | |
| 2019/0084542 A1 | 3/2019 | Eckert | |
| 2019/0217842 A1 | 7/2019 | Leinung et al. | |
| 2019/0263371 A1* | 8/2019 | Goers | B60T 15/027 |
| 2019/0337503 A1 | 11/2019 | Otremba | |

FOREIGN PATENT DOCUMENTS

| | | |
|---|---|---|
| DE | 196 53 264 A1 | 6/1998 |
| DE | 102014012596 A1 | 3/2016 |
| DE | 102014012712 A1 | 3/2016 |
| DE | 102015001628 A1 | 8/2016 |
| DE | 102015006197 A1 | 11/2016 |
| DE | 102015011296 A1 | 3/2017 |
| DE | 102016117837 A1 | 3/2018 |
| EP | 1 826 085 A2 | 8/2007 |
| EP | 3112230 A1 | 1/2017 |
| WO | WO 2006122374 A1 | 11/2006 |

\* cited by examiner

US 11,926,294 B2

RELAY VALVE MODULE FOR USE AS AN AXLE MODULATOR AND TRAILER CONTROL MODULE

CROSS-REFERENCE TO PRIOR APPLICATIONS

This application is a continuation of International Patent Application No. PCT/EP2019/071945, filed on Aug. 15, 2019, which claims priority to German Patent Application No. DE 10 2018 122 193.2, filed on Sep. 12, 2018. The entire disclosure of both applications is incorporated by reference herein.

FIELD

The invention relates to a relay valve module for an electronically controllable pneumatic brake system for actuating wheel brakes of a utility vehicle, having a reservoir connection for receiving a reservoir pressure, a brake control pressure connection for receiving a brake control pressure, at least one first service brake connection for outputting a service brake pressure, a relay valve with a relay valve reservoir connection, which is connected to the reservoir connection, with a relay valve working connection, which is connected to the first service brake connection, with a relay valve ventilation connection and with a relay valve control connection, and an electropneumatic pilot control unit, which is connected to the reservoir connection, for providing a pilot control pressure. The invention furthermore relates to an electronically controllable pneumatic brake system, to a utility vehicle and to a method for producing, in accordance with requirement, an axle modulator and a trailer control module.

BACKGROUND

EP 1 826 085 A2 describes a compressed-air brake system of a wheeled vehicle, in the case of which compressed-air brake system the control valves for actuating the wheel brakes of each vehicle axle are combined in one axle valve module. At least the axle valve module of the rear axle comprises a relay valve and in each case one ABS inlet valve and one ABS outlet valve for the wheel brake cylinders of both sides of the rear axle. In more modern designs of such an axle valve module from WABCO GmbH, both the relay valve and the ABS inlet valves and the ABS outlet valves of each side of the vehicle axle are each designed as a diaphragm valve unit, as known for example from DE 10 2014 012 596 A1 or DE 10 2014 012 712 A1. Each of these diaphragm valve units has an inlet diaphragm valve and an outlet diaphragm valve, in the case of each of which a control pressure chamber adjoining the respective diaphragm of the respective diaphragm valve can be selectively charged with a high control pressure or the ambient pressure via an associated pilot control valve. The pilot control valves are designed as cyclically controllable 3/2 directional solenoid switching valves. When a high control pressure is applied, the diaphragm valves are closed. When ambient pressure is applied, the diaphragm valves are open, such that the working pressure outlets are connected via the respective inlet diaphragm valve to the respective working pressure inlet and via the respective outlet diaphragm valve to a ventilation outlet.

In order, independently of the actuation of a brake pedal by the driver and of the ABS control of the wheel brakes by means of the ABS inlet valves and the ABS outlet valves, to allow an actuation of the wheel brakes in the context of driving safety functions, such as drive slip control (ASR) or automatic traction control (ATC), roll stability control (RSC), electronic stability control (ESC) or an electronic stability program (ESP) and an external braking request (XBR), a switchover valve is connected upstream of the control pressure inlet of the relay valve, by means of which switchover valve said control pressure inlet is connectable selectively to a brake pressure line conducting a brake pressure or to a reservoir pressure line conducting a reservoir pressure. The brake pressure is commonly set through the actuation of a brake pedal by way of a brake pedal valve which is mechanically connected to said brake pedal, though may also be set by means of an electropneumatic brake valve if a so-called electronic brake pedal is used as brake transducer. The reservoir pressure is commonly provided by a compressed-air supply system and forms the maximum available brake pressure.

Owing to component tolerances in the ABS valves and the pilot control valves thereof, it is possible in the case of certain functions in which the braking force is intended to be equal on both sides of the vehicle axle, such as in the case of electronic braking force limitation (EBL) and automatic emergency braking by the brake assistant of an adaptive cruise control system (ACC), for different brake pressures to arise in the wheel brake cylinders of the two sides of the vehicle axle, resulting in the destabilization of the wheeled vehicle.

SUMMARY

In an embodiment, the present invention provides a relay valve module for an electronically controllable pneumatic brake system for actuating wheel brakes of a utility vehicle, comprising: a reservoir connection configured to receive a reservoir pressure; a brake control pressure connection configured to receive a brake control pressure; at least one first service brake connection configured to output a service brake pressure; a relay valve with a relay valve reservoir connection, which is connected to the reservoir connection, a relay valve working connection, which is connected to the first service brake connection, a relay valve ventilation connection, and a relay valve control connection; an electropneumatic pilot control unit, which is connected to the reservoir connection, the electropneumatic pilot control unit being configured to provide a pilot control pressure; and a shuttle valve with a first shuttle valve inlet, a second shuttle valve inlet, and a shuttle valve outlet, wherein the first shuttle valve inlet is connected to the brake control pressure connection to receive the brake control pressure, the second shuttle valve inlet is connected to the pilot control unit to receive the pilot control pressure, and the shuttle valve outlet is connected to the relay valve control connection to output to the relay valve control connection the respectively higher of the brake control pressure or the pilot control pressure.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
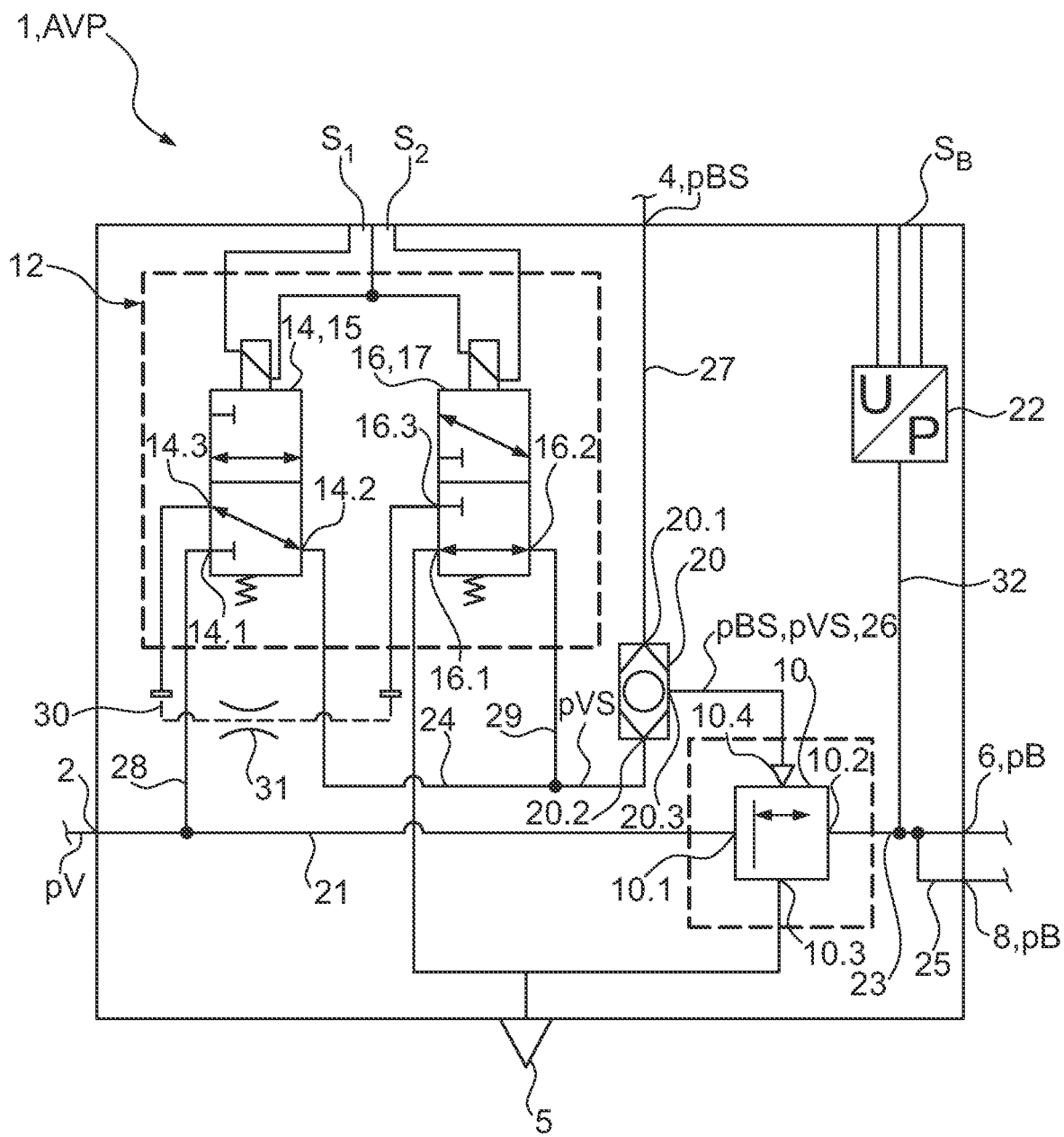
FIG. 1 shows a schematic view of a relay valve module, in particular axle modulator, in a first exemplary embodiment.

In an embodiment, the present invention provides a relay valve module of the type mentioned in the introduction which is inexpensive to produce, uses the greatest possible number of identical parts, is usable in a versatile manner and in particular also allows an improved transition between a pneumatic and electronic output of brake pressures.

In an embodiment, the present invention provides a relay valve module of the type mentioned in the introduction by means of a shuttle valve with a first shuttle valve inlet, with a second shuttle valve inlet and with a shuttle valve outlet, wherein the first shuttle valve inlet is connected to the brake pressure connection for the purposes of receiving the brake control pressure, the second shuttle valve inlet is connected to the pilot control unit for the purposes of receiving the pilot control pressure, and the shuttle valve outlet is connected to the relay valve control connection for the purposes of outputting the respectively higher out of the brake control pressure or the pilot control pressure to the relay valve control connection. In this way, the respectively higher out of the brake control pressure and the pilot control pressure can be output to the relay valve control connection. The brake control pressure may for example originate from a pneumatic brake transducer or from another axle of the vehicle and thus represent a braking request. The pilot control pressure is electrically output by means of the electropneumatic pilot control unit. This may be controlled for example by an electronic controller provided in the relay valve module or by some other coordinate or superordinate module. It is thus possible for an electronic braking specification to be converted into the service brake pressure by means of the electropneumatic pilot control unit. The service brake pressure can then be fed for example to wheel brakes of a tractor vehicle or else provided via a trailer control connection (yellow coupling head in Europe; glad hand BLUE in north America) for a trailer. In this respect, the relay valve module according to the present invention is usable in a versatile manner, in particular in axle modulators, front axle and rear axle modulators, and in trailer control modules.

It may be provided that the brake control pressure is output at the brake control pressure connection only in a redundancy situation, for example in order to compensate for another module which is no longer functional, or for a fault in the electropneumatic pilot control unit. It may however also be provided that the brake control pressure connection is used for normal operation and for the pneumatic output of the service brake pressure.

By virtue of the fact that the relay valve module can be used in a versatile manner for electropneumatic applications within an electronically controllable pneumatic brake system, it is possible for identical parts to be used, whereby logistics are simplified and production costs can also be reduced.

In a first preferred embodiment, it is provided that the relay valve module has a pressure sensor for detecting the service brake pressure and providing a corresponding brake pressure signal. If the relay valve module has a dedicated control unit, the pressure sensor preferably provides the brake pressure signal thereto. Otherwise, the relay valve module preferably has a pressure sensor interface via which the brake pressure signal can be transmitted to a further coordinate or superordinate electronic control unit. In this way, complete closed-loop control of the brake pressure can be generated, in particular if the service brake pressure is output by means of the electropneumatic pilot control unit. It is also possible, if for example a pneumatic output by means of the brake control pressure is provided in normal operation, for a pilot control pressure higher than the brake control pressure to additionally be output by means of the electropneumatic pilot control unit if it is detected by means of the pressure sensor that the pneumatically output service brake pressure is too low. In this way, it is also possible for safety to be increased.

Preferably, the pilot control unit has an electrically switchable inlet valve and an electrically switchable outlet valve. At least one of these two valves is provided as a normally open valve in order to avoid the build-up of pressures within the system. It is preferable for both valves to each be designed as 3/2 directional valves. In this way, it is furthermore possible for identical parts to be used. Inlet valve and outlet valve are identical in terms of their construction, such that the same valve can be used for these. The functionality thereof then arises from the actuation or the cabling in order to use these as inlet and outlet valves respectively.

Accordingly, in one embodiment, it is provided that the inlet valve has a first inlet valve connection, which is connected to the reservoir connection, a second inlet valve connection, which is connected or connectable to a pilot control pressure line which leads to the second shuttle valve connection, and a third inlet valve connection. The expression "connected" or "connectable" means that a direct connection between the pilot control pressure line and the second inlet valve connection is not necessary. Here, it may be provided that a further valve is connected in between. The third inlet valve connection may be closed or else connected to a vent or pressure sink. It is preferable if the inlet valve, when electrically deenergized, is in a first switching position, in which the third inlet valve connection is connected to the second inlet valve connection, and can be moved by electrical energization into a second switching position, in which the first inlet valve connection is connected to the second inlet valve connection, such that in this case the reservoir pressure is then passed through the inlet valve and is preferably provided as pilot control pressure at the second inlet valve connection. Said pilot control pressure is then provided via the pilot control pressure line to a second shuttle valve connection and can, if it exceeds the brake control pressure, be output at the shuttle valve outlet.

In this embodiment, it is preferably furthermore provided that the outlet valve has a first outlet valve connection, which is connected to a vent, a second outlet valve connection, which is connected to the pilot control pressure line, and a third outlet valve connection. The outlet valve serves primarily to ventilate the pilot control pressure line and thus the second shuttle valve connection. Accordingly, it is preferable if the outlet valve, when electrically deenergized, is in a first switching position in which the first outlet valve connection is connected to the second outlet valve connection. When electrically energized, the outlet valve can then be moved into a second switching position in which the third outlet valve connection is connected to the second outlet valve connection. In one embodiment, the third outlet valve connection may in turn be closed. It is to be understood that the outlet valve may likewise also be designed as a 2/2 directional valve if the third outlet valve connection is closed. The same also applies to the inlet valve.

In one variant, the third inlet valve connection and the third outlet valve connection are connected to one another. In this way, it is preferably the case that, in an electrically deenergized state, both the second and the third inlet valve connection are ventilated and an undesired pressure build-up in closed-off regions is prevented. Furthermore, in this way, a pilot control pressure can be confined if the second and third inlet valve connection and the second and third outlet valve connection are connected to one another. This may be advantageous in particular if ABS functionalities are implemented and a further ventilation of individual wheel brakes at which the service brake pressure is to be output can also be performed via the ABS valves or modules.

In one variant, the outlet valve has a first outlet valve connection, which is connected to the second inlet valve connection, a second outlet valve connection, which is connected to the pilot control pressure line, and a third outlet valve connection. Preferably, the third outlet valve connection is in turn closed. In this embodiment, the first outlet valve connection is consequently connected via the pilot control pressure line to the second inlet valve connection. This means that the inlet valve outputs the pilot control pressure through the outlet valve to the shuttle valve. In this way, it is possible overall to omit a pneumatic connection.

In one refinement, or a second aspect of the invention, the relay valve module according to any of the above-described preferred embodiments of a relay valve module according to the first aspect of the invention is used as an axle modulator, in particular front axle modulator. Here, the first service brake connection is provided for a first vehicle side, and the relay valve module furthermore has a second service brake connection, which is connected to the relay valve working connection, for outputting the service brake pressure for a second vehicle side. The relay valve module consequently has a first and a second service brake connection at which in each case the same service brake pressure is output. The axle modulator according to this embodiment can be used both as a front axle modulator and as a rear axle modulator. For example, the first service brake connection is provided for the left-hand vehicle side and the second service brake connection is provided for the right-hand vehicle side. If it is additionally sought to achieve wheel-specific braking, it is possible for ABS modules to be connected downstream of the corresponding first and second service brake connections. The relay valve module of this embodiment may also be integrated into a larger module, such that individual components of the relay valve module become part of a superordinate unit.

According to a further preferred embodiment of the relay valve module used as an axle modulator, said relay valve module has integrated ABS units or flange-mounted ABS modules. It is accordingly provided that the relay valve module has a first ABS inlet valve, a second ABS inlet valve, a first ABS outlet valve and a second ABS outlet valve for at least one wheel brake cylinder at each side of the vehicle axle. These are each designed as a pressure-controlled diaphragm valve with an associated pilot control valve, wherein said pilot control valves are designed as cyclically controllable 3/2 directional valves by means of which in each case one control pressure chamber of the associated diaphragm valve can be charged selectively with service brake pressure or with control pressure picked off at the relay valve control connection of the relay valve or with the ambient pressure. By virtue of the pilot control valves being designed, in turn, as 3/2 directional valves, it is further possible for identical parts to be used. The ABS inlet and outlet valves may be integrated with the other elements of the relay valve module into a common housing.

According to a further preferred embodiment or a third aspect of the invention, a relay valve module according to any of the above-described preferred embodiments of a relay valve module according to the first aspect of the invention is used as a trailer control module, wherein the first service brake connection is designed for connecting to a trailer control connection (yellow coupling head), and the relay valve module furthermore has a trailer supply connection which is provided for connecting to a trailer supply pressure connection (red coupling head) for the purposes of supplying reservoir pressure to a trailer. Trailer control modules generally supply both a reservoir pressure and a control pressure, which represents a braking request, to the trailer (yellow and red coupling heads). In this exemplary embodiment, the control pressure is transmitted to the trailer via the service brake connection, whereas the relay valve module furthermore has a trailer supply connection at which reservoir pressure for the trailer is provided. The reservoir pressure can simply be passed through by the relay valve module from the reservoir connection.

It may however also be provided that a rapid ventilation valve is connected to the trailer supply connection, in particular is directly flange-mounted on the relay valve module. Such a rapid ventilation valve can, in particular in north American variants, rapidly and quietly ventilate the volume situated in the system, for example if it is the intention to park the trailer.

It may furthermore be preferred for a further shuttle valve to be connected to the brake pressure connection, which further shuttle valve outputs the respectively higher out of the brake control pressure and an anti-jackknifing brake pressure to the brake control pressure connection. This is preferable in particular if the brake system in which the relay valve module is installed as trailer control module has an anti-jackknifing braking functionality. The control pressure provided by the anti-jackknifing braking functionality, specifically the anti-jackknifing brake pressure, can then be provided to the shuttle valve and output instead of the brake control pressure to the brake control pressure connection, such that a service brake pressure for the trailer is correspondingly output. In a variant with an electrical anti-jackknifing brake, it is preferred for the corresponding electrical anti-jackknifing braking request to be electrically corrected by means of the inlet and outlet valves of the pilot control unit. In this case, the further shuttle valve can then be omitted.

In a fourth aspect, the invention achieves the object stated in the introduction by means of an electronically controllable pneumatic brake system, having a relay valve module which is used as a front axle modulator and having a relay valve module which is used as a trailer control module, and a brake transducer with at least one pneumatic brake transducer connection and one electric brake transducer connection, a central module, and a rear axle modulator, wherein the pneumatic brake transducer connection is connected to the brake control pressure connection of the front axle modulator and/or to the brake control pressure connection of the trailer control module, and the electric brake transducer connection is connected to the central module. Such a brake system firstly allows a purely electronic output of brake pressures, specifically by virtue of the electronic brake transducer connection being connected to the central module. The central module can then transmit corresponding signals to the front axle modulator, the rear axle modulator and the trailer control module in order to effect a corresponding electrical output of brake pressures. Alternatively or only for a redundancy situation, the front axle modulator and the trailer control module however also allow a purely pneumatic output of brake pressures, specifically by virtue of the fact that the braking request pneumatically output by the brake transducer is output at the brake control pressure connection of the front axle modulator and of the trailer control module and can then, via the corresponding shuttle valves, replace the electrically output pressure if the brake pressure output at the brake pressure control connection is higher. Since the front axle modulator and the trailer control module are almost identical in construction, a large number of identical parts can be used, and the brake system as a whole can be produced at lower cost.

It is to be understood that the relay valve module according to the first, second and third aspect and the electronically controllable pneumatic brake system according to the fourth aspect of the invention have identical and similar sub-aspects, as reflected in particular in the dependent claims. In this respect, for particular embodiments of the brake system, reference is also made to the previous embodiments of the relay valve module.

In a fifth aspect, the object stated in the introduction is achieved by means of a method for producing an axle modulator and a trailer control module in accordance with requirement, having the steps: providing and producing the relay valve module according to one of the above-described preferred embodiments of a relay valve module according to the first aspect of the invention; and providing or enabling, in accordance with requirement, a second service brake connection for outputting the service brake pressure for a second vehicle side in order to produce the axle modulator; or providing or enabling, in accordance with requirement, a trailer supply connection which is provided for connecting to a trailer supply pressure connection (red coupling head), for the purposes of supplying reservoir pressure to a trailer, in order to produce the trailer control module. According to this method, it is possible for both an axle modulator and a trailer control module to be formed from the same semifinished part, specifically the relay valve module according to the first aspect of the invention, by simple provision or enabling of connections. It may be provided that the relay valve module according to the first aspect of the invention has both a second service brake connection and a trailer supply connection, which are however then only enabled, for example by removal of corresponding plugs, in order to produce the respective module, the axle modulator or trailer control module. In this way, the production of an axle modulator and of a trailer control module is possible particularly easily and in accordance with requirement.

In a sixth aspect, the invention achieves the object stated in the introduction by means of a utility vehicle having an electronically controllable pneumatic brake system of the type mentioned above.

Embodiments of the invention will now be described below on the basis of the drawings. The drawings are not necessarily intended to illustrate the embodiments to scale; rather, the drawings are of schematic and/or slightly distorted form where expedient for explanatory purposes. With regard to additions to the teaching that emerges directly from the drawings, reference is made to the relevant prior art. Note here that numerous modifications and changes regarding the form and the detail of an embodiment may be made without departing from the general concept of the invention. The features of the invention disclosed in the description, in the drawings and in the claims may be essential to the refinement of the invention both individually and in any desired combination. Furthermore, the scope of the invention encompasses all combinations of at least two of the features disclosed in the description, in the drawings and/or in the claims. The general concept of the invention is not restricted to the exact form or the detail of the preferred embodiments shown and described below, or restricted to subject matter which would be restricted in relation to the subject matter claimed in the claims. Where dimensional ranges are stated, it is also the intention that values lying within the stated limits are disclosed, and can be used and claimed as desired, as limit values. For the sake of simplicity, the same reference designations are used below for identical or similar parts or parts with identical or similar function.

A relay valve module 1 has, in a first exemplary embodiment (FIG. 1), a reservoir connection 2 for receiving reservoir pressure pV. The reservoir pressure pV may originate from a compressed-air reservoir, for example the first, second or third compressed-air reservoir, depending on how the relay valve module 1 is used. It may also be provided that two compressed-air reservoirs are connected via a select-high valve to the reservoir connection 2. Furthermore, the relay valve module 1 has a brake control pressure connection 4 for receiving a brake control pressure pBS. The brake control pressure pBS is a pressure which indicates a braking demand, that is to say preferably a pressure output by an at least partially pneumatic brake transducer BST, or the pressure of a further axle, if this is to be output by means of the relay valve module 1 for example in a redundancy situation. Furthermore, the relay valve module 1 has a first service brake connection 6 for outputting the service brake pressure pB. In the embodiment illustrated in FIG. 1, the relay valve module 1 is designed as an axle modulator AVP, and accordingly also has a second service brake connection 8, at which likewise the service brake pressure pB is output. The same service brake pressure pB is output both at the first and at the second service brake connection 6, 8, which service brake pressure can then be output to left-hand and right-hand wheel brakes 204, 206 for example at the front axle VA (cf. FIG. 5).

Both the first and the second service brake connection 6, 8 are supplied by a relay valve 10 which serves for boosting the brake control pressure pBS or a pilot control pressure pVS in terms of volume and outputting same to the first service brake connection 6 and, in this exemplary embodiment, also to the second service brake connection 8. The pilot control pressure pVS is output by a pilot control unit 12, which in turn is connected to the reservoir connection 2.

Figure 5:
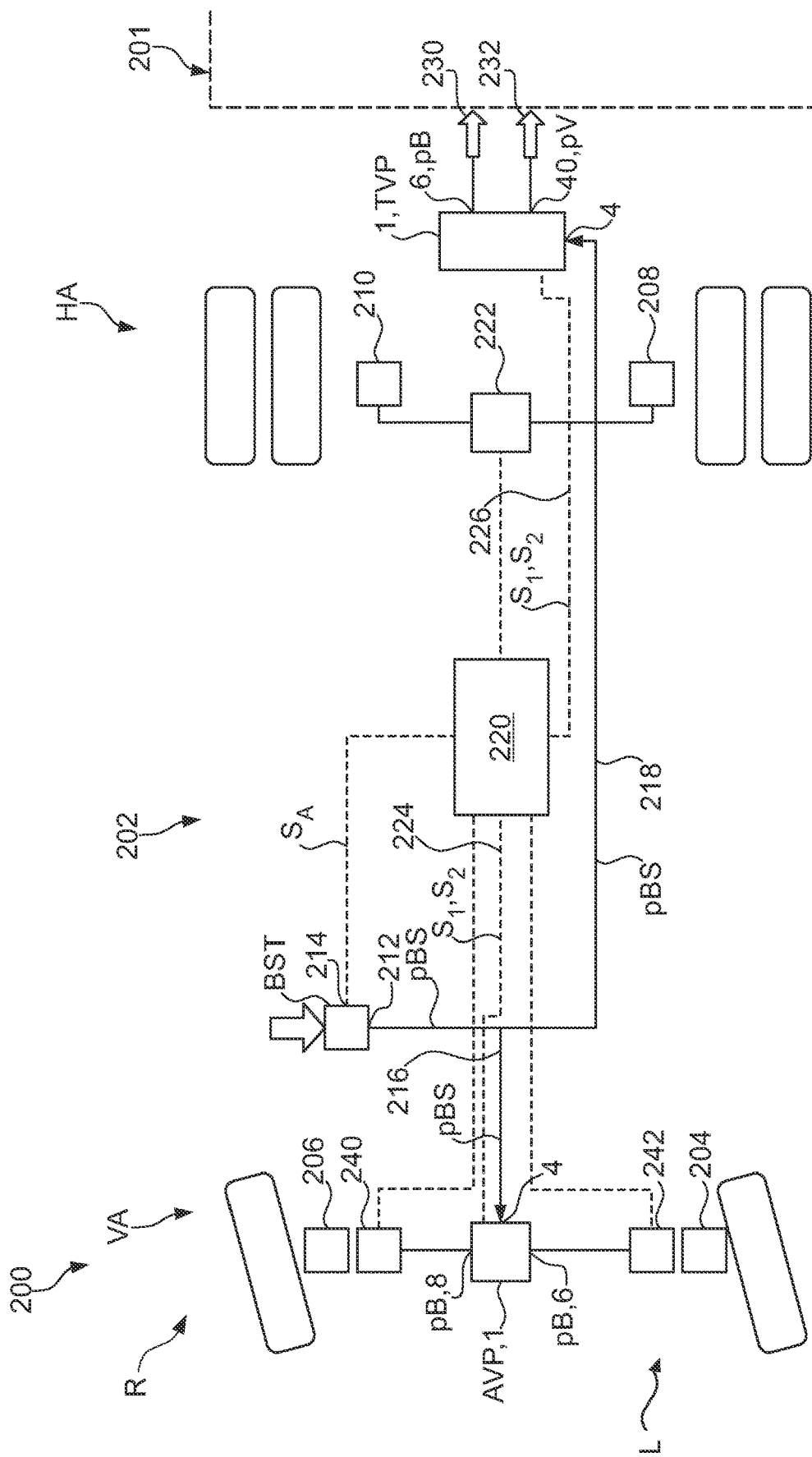
FIG. 5 is a schematic illustration of an electronically controllable pneumatic brake system.

The pilot control unit 12 is electrically controlled by means of a first and a second switching signal S1, S2, which may be specified for example by an electronic control unit (not shown) provided for the relay valve module 1, or else may be specified directly by a superordinate module, for example a central module 220 (cf. FIG. 5). More specifically, the pilot control unit 12 in this exemplary embodiment has an inlet valve 14 and an outlet valve 16, wherein the inlet valve 14 is designed as a 3/2 directional valve 15 and the outlet valve 16 is designed as a 3/2 directional valve 17. The inlet valve 14 can be controlled electrically by means of the first switching signal S1, and the outlet valve 16 can be controlled electrically by means of the second switching signal S2. Through corresponding switching of the inlet and outlet valves 14, 16, the pilot control pressure pVS can be output.

In order for an output to be provided to the relay valve 10 in a manner dependent on which of the two control pressures, brake control pressure pBS or pilot control pressure pVS, is higher, a shuttle valve 20 is provided. The shuttle valve 20 has a first shuttle valve inlet 20.1, to which the brake control pressure pBS is output. The shuttle valve 20 furthermore has a second shuttle valve inlet 20.2, to which the pilot control pressure pVS is output. The shuttle valve 20 is designed as a select-high valve, such that the respectively higher out of the pressures prevailing at the first and second shuttle valve inlet 20.1, 20.2 is transmitted to the shuttle valve outlet 20.3. The shuttle valve outlet 20.3 is then connected to the relay valve 10, by means of which the pressure pBS, pVS received from the shuttle valve 20 is provided, boosted in terms of volume, to the first service brake connection 6 and possibly to the second service brake connection 8.

Specifically, the relay valve 10 has a relay valve reservoir connection 10.1, which is connected via a first reservoir line 21 to the reservoir connection 2. Furthermore, the relay valve 10 has a relay valve working connection 10.2, which is connected to a first service brake line 23, from which a second service brake line 25 branches off. The first service brake line 23 connects the relay valve working connection 10.2 to the first service brake connection 6, and the second service brake line 25 connects the first service brake line 23 to the second service brake connection 8. The relay valve 10 furthermore has a relay valve ventilation connection 10.3, which is connected to a vent 5. Finally, the relay valve 10 has a relay valve control connection 10.4, at which the control pressures pBS, pVS are output. For this purpose, the relay valve control connection 10.4 is connected via a first control line 26 to the shuttle valve outlet 20.3. The first shuttle valve inlet 20.1 is connected via a brake control line 27 to the brake control pressure connection 4, though may also be connected directly to the brake control pressure connection 4. The second shuttle valve inlet 20.2 is connected to a pilot control pressure line 24, into which the pilot control pressure pVS is output by the pilot control unit 12.

The inlet valve 14 of the pilot control unit 12 has, in this exemplary embodiment, a first inlet valve connection 14.1, a second inlet valve connection 14.2 and a third inlet valve connection 14.3. The first inlet valve connection 14.1 is connected to a reservoir branch line 28, which branches off from the first reservoir line 21 and provides the reservoir pressure pV to the first inlet valve connection 14.1. The second inlet valve connection 14.2 is connected to the pilot control pressure line 24. The third inlet valve connection 14.3 is closed in this exemplary embodiment. The inlet valve 14 has a first switching position which is shown in FIG. 1 and in which the second inlet valve connection 14.2 is connected to the third inlet valve connection 14.3. In this switching position, no pilot control pressure pVS is output. Through provision of the first switching signal S1, the inlet valve 14 can be switched into the second switching position which is not shown in FIG. 1 and in which the first inlet valve connection 14.1 is connected to the second inlet valve connection 14.2, such that the pilot control pressure pV is passed through by the inlet valve 14 and is provided as pilot control pressure pVS in the pilot control pressure line 24. The pilot control pressure pVS then prevails at the second shuttle valve inlet 20.2. If the pilot control pressure pVS is higher than the brake control pressure pBS, the shuttle valve 20 switches over and transmits the pilot control pressure pVS from the second shuttle valve inlet 20.2 to the shuttle valve outlet 20.3, such that this pressure then prevails at the relay valve control connection 10.4, which then provides said pressure, boosted in terms of volume, to the first and second service brake connections 6, 8.

For the ventilation of the pilot control pressure line 24 and of the second shuttle valve inlet 20.2, the outlet valve 16 is provided. This has a first outlet valve connection 16.1, a second outlet valve connection 16.2 and a third outlet valve connection 16.3. The first outlet valve connection 16.1 is connected to the vent 5. Ambient pressure thus prevails at said first outlet valve connection. The second outlet valve connection 16.2 is connected via a first ventilation line 29 to the pilot control pressure line 24. The third outlet valve connection 16.3 is in turn closed. The outlet valve 16 has a first, electrically deenergized switching position which is shown in FIG. 1 and in which the second outlet valve connection 16.2 is connected to the first outlet valve connection 16.1 and thus the pilot control pressure line 24 is ventilated. If, however, a pilot control pressure pVS is provided by the inlet valve 14, it is preferable to close the outlet valve 16, that is to say move said outlet valve into the second switching position which is not shown in FIG. 1, specifically through provision of the second switching signal S2. Then, the second outlet valve connection 16.2 is connected to the third outlet valve connection 16.3, and the first ventilation line 29 is closed.

In a variant which is likewise shown in FIG. 1, the third inlet valve connection 14.3 and the third outlet valve connection 16.3 are connected to one another via a connecting line 30. The connecting line 30 is equipped with a restrictor 31. In the switching position shown in FIG. 1, it is thus possible to prevent a pressure from building up owing to leakages if the third inlet valve connection 14.3 is directly closed. There is somewhat more space here owing to the connecting line 30. Furthermore, if the outlet valve 16 is switched into the second switching position which is not shown in FIG. 1, a pilot control pressure pVS can be confined and is maintained.

Finally, the relay valve module 1 according to the first exemplary embodiment shown in FIG. 1 has a pressure sensor 22. The pressure sensor 22 is connected via a measurement line 32 to the first service brake line 23 and thus receives the service brake pressure pB. The pressure sensor 22 provides a pressure signal SB, which can either be processed directly in an electronic control unit which is not shown, or else can be transmitted to a superordinate unit such as, for example, the central module 220 (cf. FIG. 5). In this way, it is possible to implement complete closed-loop control, even if the service brake pressure pB is pneumatically output. If, for example, it is detected by means of the pressure sensor 22 that the service brake pressure pB output on the basis of the service control pressure pBS is too low, it is possible by means of the pilot control unit 12 to output the pilot control pressure pVS in order to attain a service brake pressure pB which corresponds to a predefined setpoint value. Furthermore, by means of the pressure sensor 22, it is made easier to achieve a transition between a pneumatic output of the service brake pressure pB and an electrical output of the service brake pressure pB. If a switch is made from a pneumatic output to an electrical output, it is known, owing to the pressure sensor 22, what magnitude of service brake pressure pB must be output. In relation to a hitherto conventional ABS system, this arrangement allows the outputting of a precise output pressure which, in the case of a request which is equal on both sides, does not need to be influenced by means of downstream ABS valves. This reduces the number of actuations of the ABS valves.

Figure 2:
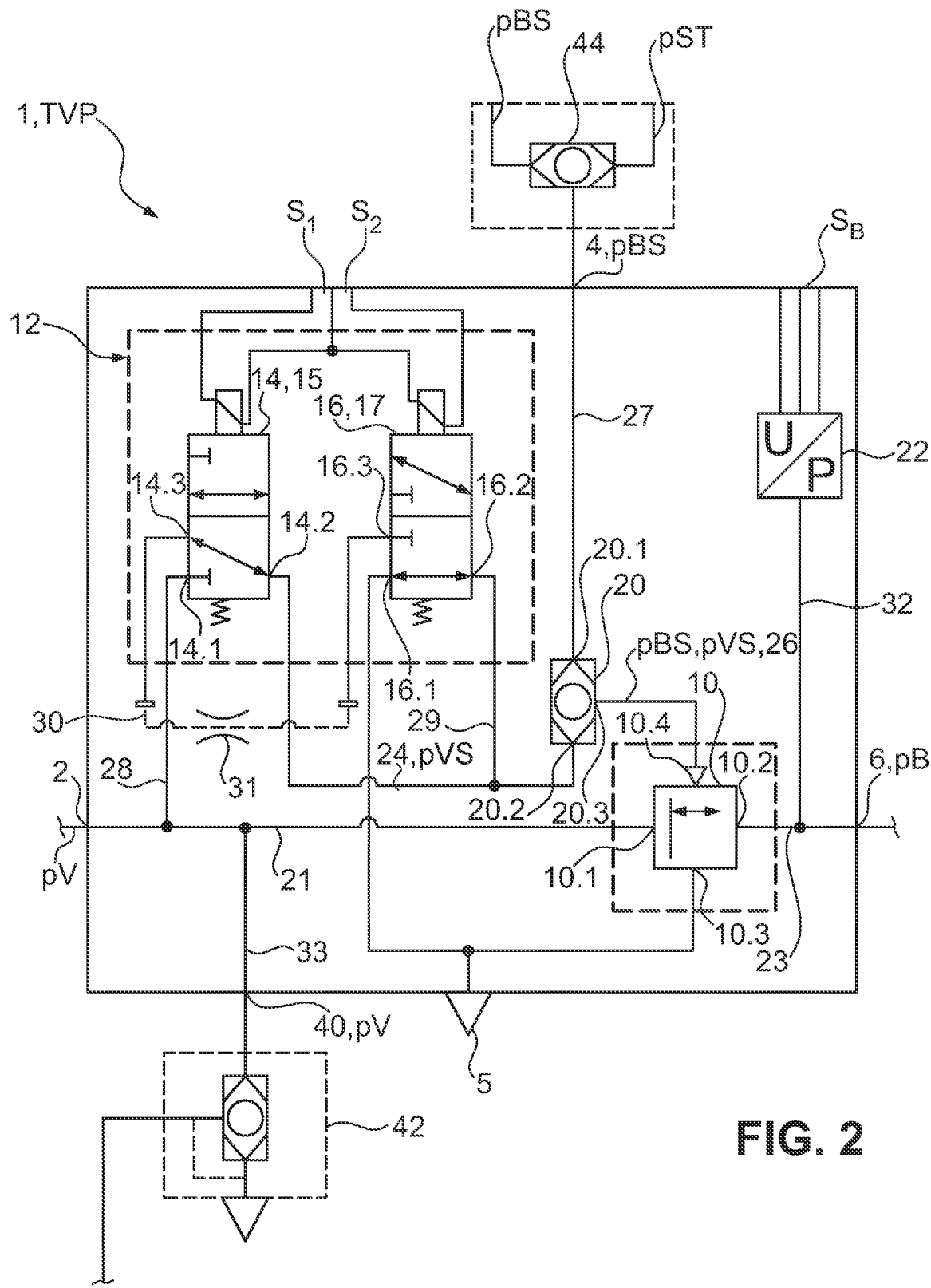
FIG. 2 shows a second exemplary embodiment of a relay valve module, in particular trailer control module.

FIG. 2 shows an exemplary embodiment in which the relay valve module 1 is formed as a trailer control module TVP. For this reason, it has only one, specifically the first, service brake connection 6, which is then, in this exemplary embodiment, provided for being connected to a trailer control connection 230 (cf. FIG. 5). The trailer control connection 230 is also referred to in Europe as "yellow coupling head"; in north America, it is commonly referred to as "glad hand BLUE", "control line" or "service line". Additionally, the trailer control module TVP according to this exemplary embodiment has a trailer supply connection 40, at which the reservoir pressure pV can be provided. For this purpose, the trailer supply connection 40 is connected via a second reservoir branch line 33 to the first reservoir line 21. No valve is connected between the reservoir connection 2 and the trailer supply connection 40, and the reservoir pressure pV is simply passed through. Provision may however also be made for an additional shut-off valve to be provided in the relay valve module 1. It is to be understood that the trailer supply connection 40 is not imperatively necessary if a supply is to be provided to a trailer. It is likewise conceivable and preferable for the reservoir pressure pV for the trailer to be branched off upstream of the reservoir connection 2, and to circumvent the relay valve module 1. Here, the trailer supply connection 40 and the second reservoir branch line 33 can then be omitted.

In the embodiment shown in FIG. 2, an optional rapid ventilation valve 42 is flange-mounted onto the relay valve module 1, specifically at the trailer supply connection 40. The trailer supply connection 40 is connectable via the rapid ventilation valve 42 to a trailer supply pressure connection 232, which is also referred to in Europe as "red coupling head"; in north America, it is correspondingly referred to as "glad hand RED", "supply line" or "emergency line". Supply pressure pV for the trailer 201 is provided via said trailer supply pressure connection 232, whereas a braking demand for the trailer 201 is provided via the trailer control connection 230 (cf. FIG. 5). The rapid ventilation valve 42 serves for the rapid ventilation of the volume in the system. It is of known design.

It can also be seen in FIG. 2 that a further shuttle valve 44 is provided so as to be connected upstream of the brake control pressure connection 4. The further shuttle valve 44 serves for outputting the higher out of the service control pressure pBS and an anti-jackknifing brake pressure pST, which is provided by an anti-jackknifing braking functionality, to the brake control pressure connection 4. An anti-jackknifing braking functionality may be configured in a known manner.

Figure 3:
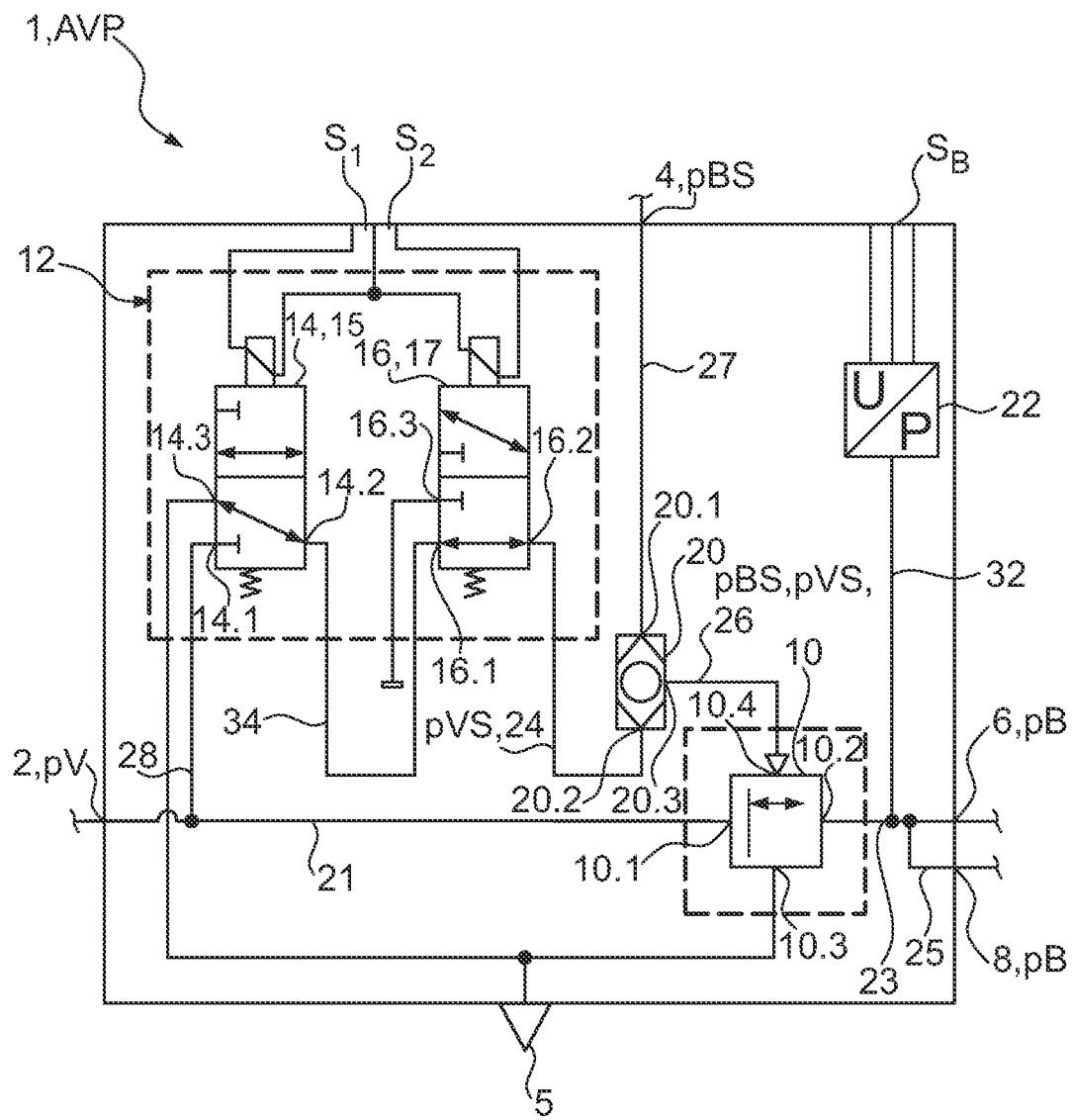
FIG. 3 shows a third exemplary embodiment of a relay valve module, in particular axle modulator.

FIG. 3 illustrates a second exemplary embodiment of a relay valve module 1 used as an axle modulator AVP. The exemplary embodiment shown in FIG. 3 is based in principle on the exemplary embodiment shown in FIG. 1, and it is in turn the case that a first and a second service brake connection 6, 8 are provided. In particular the differences in relation to the first exemplary embodiment will be highlighted below.

The third exemplary embodiment of the relay valve module (FIG. 3) differs from the first exemplary embodiment of the relay valve module 1 (FIG. 1) in the connection configuration of the pilot control unit 12. More specifically, in this exemplary embodiment (FIG. 3), the first outlet valve connection 16.1 is connected not to the vent 5 but directly to the second inlet valve connection 14.2. For this purpose, a second control line 34 is provided which connects the two connections to one another. The first inlet valve connection 14.1 is, as is also the case in the first exemplary embodiment, connected to the first reservoir branch line 28, and receives the reservoir pressure pV. By contrast to the first exemplary embodiment, however, the third inlet valve connection 14.3 is connected directly to a vent 5. In order to thus ventilate the pilot control line 24, it is necessary for both the inlet valve 14 and the outlet valve 16 to be moved into their first, electrically deenergized switching positions shown in FIG. 3. For the ventilation of the pilot control pressure line 24, it is however merely necessary for the inlet valve 14 to be moved into the second switching position which is not shown in FIG. 3. By switching of the outlet valve 16, the pilot control pressure pVS can be confined in the pilot control pressure line 24.

Figure 4:
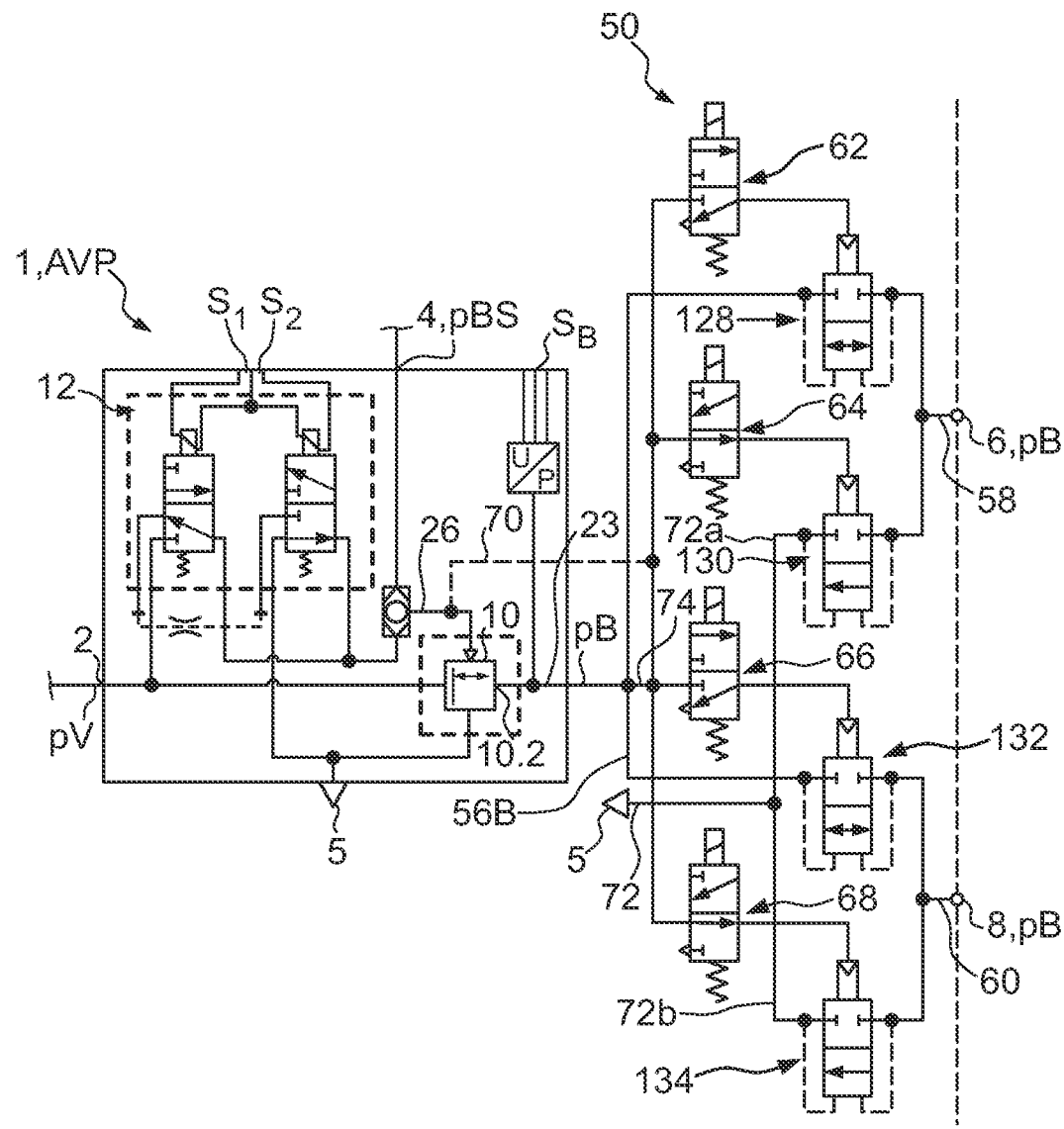
FIG. 4 shows a fourth exemplary embodiment of a relay valve module, in particular axle modulator.

FIG. 4 shows a further exemplary embodiment of the relay valve module 1, wherein, in this exemplary embodiment (FIG. 4), an ABS unit 50 is provided. The ABS unit 50 may also be composed of two ABS modules 240, 242, which are connected upstream of corresponding wheel brakes 204, 206. The ABS unit 50 may be integrated with the relay valve module 1 into a common housing, or may be flange-mounted on the housing of the relay valve module 1.

As can be seen from FIG. 4, the relay valve module 1 is in principle designed correspondingly to the first exemplary embodiment, wherein the ABS unit 50 connects to the relay valve working connection 10.2. Thus, in this exemplary embodiment, the first service brake line 23 leads to the ABS unit 50. The first and second service brake connections 6, 8 are correspondingly arranged downstream of the ABS unit 50. The ABS unit 50 is connected between these and the relay valve working connection 10.2.

The ABS unit 50 comprises in each case one first and second ABS inlet valve 128, 132 and in each case one first and second ABS outlet valve 130, 134 for at least one wheel brake 206, 204 at each side of the front axle VA. First and second axle brake lines 56a, 56b branch off from the first service brake line 23. Said first and second axle brake lines are connected at the inlet side to the first and second ABS inlet valves 128, 132. At the first and second ABS inlet valves 128, 132, in each case one wheel brake line 58, 60 which leads to the respective outlet-side service brake connection 6, 8 is connected at the outlet side to the first and second ABS inlet valves 128, 132. By means of the first and second ABS inlet valves 128, 132, which in the present case are designed as pressure-controlled 2/2 directional diaphragm valves, the wheel brake lines 58, 60 can be selectively connected to, or shut off in relation to, the respective first and second axle brake lines 56a, 56b.

The first and second ABS inlet valves 128, 132 are respectively assigned a first and second pilot control valve 62, 66 designed as a cyclically controllable 3/2 directional valve. Via these first and second pilot control valves 62, 66, the respective control pressure inlet of the ABS inlet valves 128, 132 can be selectively charged with the ambient pressure or with a control pressure picked off at the first and second axle brake lines 56 via a branched-off third control line 70. In the non-actuated, that is to say electrically deenergized state of said first and second pilot control valves 62, 66, the first and second ABS inlet valves 128, 132 are open, such that the first and second axle brake lines 56a, 56b are connected to the wheel brake lines 58, 60, even though the first and second ABS inlet valves 128, 132, owing to their diaphragm design, are illustrated in FIG. 4 as being closed. In the actuated, that is to say electrically energized state of the first and second pilot control valves 62, 66, the first and second ABS inlet valves 128, 132 are closed, such that the first and second wheel brake lines 58, 60 are then shut off in relation to the first and second axle brake lines 56a, 56b.

A second ventilation line 72 leads to a vent 5. First and second branches 72a, 72b of the second ventilation line 72 are connected to the inlet side of a respectively associated first and second ABS outlet valve 130, 134. In each case, the wheel brake line 58, 60 leading to the respective outlet-side service brake connection 6, 8 is connected to the outlet side of the ABS outlet valves 130, 134. By means of the ABS outlet valves 130, 134, which are each designed as pressure-controlled 2/2 directional diaphragm valves, the wheel brake lines 58, 60 can be selectively connected to the respective branch 72a, 72b of the second ventilation line 72 or shut off with respect thereto.

The first and second ABS outlet valves 130, 134 are respectively assigned a third and fourth pilot control valve 64, 68 designed as a cyclically controllable 3/2 directional valve. By means of said third and fourth pilot control valves 64, 68, the respective control pressure inlet of the first and second ABS outlet valves 130, 134 can be selectively charged with the control pressure picked off at the first control line 26 via the branched-off third control line 70 or with the ambient pressure. In the non-actuated, that is to say electrically deenergized state of said third and fourth pilot control valves 64, 68, the first and second ABS outlet valves 130, 134 are closed, such that the wheel brake lines 58, 60 are shut off with respect to the branches 72a, 72b of the second ventilation line 72. In the actuated, that is to say electrically energized state of the third and fourth pilot control valves 64, 68, the first and second ABS outlet valves 130, 134 are open, such that the wheel brake lines 58, 60 are then ventilated via the branches 72a, 72b.

In an alternative arrangement to this, the control pressure for the first and second ABS inlet valves 128, 132 and the first and second ABS outlet valves 133, 134 may also be taken directly from the first service brake line 23. This is indicated by the line piece 74.

FIG. 5 then illustrates the installation of two relay valve modules 1 into a brake system 202 of a utility vehicle 200. The utility vehicle 200 is equipped with a trailer 201, which is merely schematically illustrated here. The utility vehicle 200 has a front axle VA and a rear axle HA. An electronically controllable pneumatic brake system 202 has first and second wheel brakes 204, 206 for the front axle VA and third and fourth wheel brakes 208, 210 for the rear axle HA. The brake system 202 has a central module 220 and a brake transducer BST. In the front axle VA, there is provided a front axle modulator AVP, which is designed here as a relay valve module 1. In the rear axle HA, there is arranged a rear axle modulator 222, which is in this case of conventional design. It is however to be understood that the rear axle modulator 222 or an auxiliary axle modulator may also be formed by means of the relay valve module 1.

The brake transducer BST has a pneumatic brake transducer connection 212 and an electric brake transducer connection 214. The brake control pressure pBS can be output via the pneumatic brake transducer connection 212. A brake signal SB is provided to the central module 220 via the electric brake transducer connection 214.

The brake transducer BST is connected via a first brake transducer line 216 to the brake control pressure connection 4 of the relay valve module 1 designed as front axle modulator AVP. The relay valve module 1 designed as front axle modulator AVP has a first and a second service brake connection 6, 8, which in this case are connected to first and second ABS modules 240, 242. The front axle modulator AVP is also connected via a first electrical line 224 to the central module 220, and receives the first and second switching signals S1, S2 for the relay valve module 1 designed as front axle modulator AVP. Via said first electrical line 224, the pressure sensor 22 of the front axle modulator AVP is also connected to the central module 220, such that on the one hand the central module 220 can provide the voltage supply for the pressure sensor 22, and on the other hand the brake pressure signal SB is also returned to the central module 220. The service brake pressure pB for the first and second wheel brakes 206, 204 can thus be output both pneumatically and electrically by means of the relay valve module 1 which is designed as front axle modulator AVP.

Furthermore, the brake system 202 has a trailer control module TVP, which in this case is in turn formed as a relay valve module 1. The brake transducer BST has a second brake transducer line 218, which connects the pneumatic brake transducer connection 212 to the brake control pressure connection 4 of the relay valve module 1 designed as trailer control module TVP. Furthermore, the relay valve module 1 designed as trailer control module TVP is connected via a second electrical line 226 to the central module 220 and, from this, receives the corresponding first and second switching signals S1, S2. Via said second electrical line 226, the pressure sensor 22 of the trailer control module TVP is also connected to the central module 220, such that, on the one hand, the central module 220 can provide the voltage supply for the pressure sensor 22, and on the other hand the brake pressure signal SB is also returned to the central module 220. Since the relay valve module 1 is designed as trailer control module TVP, it has only one service brake connection 6, which in this case is connected to the trailer control connection (yellow coupling head, or glad hand BLUE). The correspondingly provided trailer supply connection 40 is connected to the trailer supply pressure connection (red coupling head) 232 and provides supply pressure pV for the trailer 201. In this exemplary embodiment, the trailer 201 can thus also be controlled both pneumatically and electrically.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS (PART OF THE DESCRIPTION)

1 Relay valve module
2 Reservoir connection
4 Brake control pressure connection
5 Vent
6 First service brake connection
8 Second service brake connection
10 Relay valve
10.1 Relay valve reservoir connection
10.2 Relay valve working connection
10.3 Relay valve ventilation connection
10.4 Relay valve control connection
12 Pilot control unit
14 Inlet valve
14.1 First inlet valve connection
14.2 Second inlet valve connection
14.3 Third inlet valve connection
15 3/2 directional valve
16 Outlet valve
16.1 First outlet valve connection
16.2 Second outlet valve connection
16.3 Third outlet valve connection
17 3/2 directional valve
20 Shuttle valve
20.1 First shuttle valve inlet
20.2 Second shuttle valve inlet
20.3 Shuttle valve outlet
21 First reservoir line
22 Pressure sensor
23 First service brake line
24 Pilot control pressure line
25 Second service brake line
26 First control line
27 Brake control line
28 First reservoir branch line
29 First ventilation line
30 Connecting line
31 Restrictor
32 Pressure measurement line
33 Second reservoir branch line
34 Second control line
40 Trailer supply connection
42 Quick ventilation valve
44 Further shuttle valve
50 ABS unit
56A First axle brake line
56B Second axle brake line
58 First wheel brake line
60 Second wheel brake line
62 First pilot control valve
64 Third pilot control valve
66 Second pilot control valve
68 Fourth pilot control valve
70 Third control line
72 Second ventilation line
72a First branch
72b Second branch
74 Line piece
128 First ABS inlet valve
130 First ABS outlet valve
132 Second ABS inlet valve
134 Second ABS outlet valve
200 Utility vehicle
201 Trailer
202 Electronically controllable pneumatic brake system
204 First wheel brake
206 Second wheel brake
208 Third wheel brake
210 Fourth wheel brake
212 Pneumatic brake transducer connection
214 Electric brake transducer connection
216 First brake transducer line
218 Second brake transducer line
220 Central module
222 Rear axle modulator
224 First electrical line
226 Second electrical line
230 Trailer control connection (yellow coupling head)
232 Trailer supply pressure connection (red coupling head)
240 First ABS module
242 Second ABS module
AVP Axle modulator
BST Brake transducer
HA Rear axle
L First vehicle side
pB Service brake pressure
pBS Brake control pressure
pST Anti-jackknifing brake pressure
pV Reservoir pressure
pVS Pilot control pressure
R Second vehicle side
S1 First switching signal
S2 Second switching signal
SB Pressure signal
TVP Trailer control module
VA Front axle What claimed is:
1. A relay valve module for an electronically controllable pneumatic brake system for actuating wheel brakes of a utility vehicle, comprising:
a reservoir connection configured to receive a reservoir pressure;
a brake control pressure connection configured to receive a brake control pressure;
at least one first service brake connection configured to output a service brake pressure;
a relay valve with a relay valve reservoir connection, which is connected to the reservoir connection, a relay valve working connection, which is connected to the first service brake connection, a relay valve ventilation connection, and a relay valve control connection;
an electropneumatic pilot control unit, which is connected to the reservoir connection, the electropneumatic pilot control unit being configured to provide a pilot control pressure; and
a shuttle valve with a first shuttle valve inlet, a second shuttle valve inlet, and a shuttle valve outlet,
wherein the first shuttle valve inlet is connected to the brake control pressure connection to receive the brake control pressure, the second shuttle valve inlet is connected to the pilot control unit to receive the pilot control pressure, and the shuttle valve outlet is connected to the relay valve control connection to output to the relay valve control connection the respectively higher of the brake control pressure or the pilot control pressure.

2. The relay valve module of claim 1, wherein the pilot control unit has an electrically switchable inlet valve and an electrically switchable outlet valve.

3. The relay valve module of claim 2, wherein the inlet valve and the outlet valve each comprise 3/2 directional valves.

4. The relay valve module of claim 3, wherein the inlet valve has a first inlet valve connection, which is connected to the reservoir connection, a second inlet valve connection, which is connected or connectable to a pilot control pressure line which leads to the second shuttle valve connection, and a third inlet valve connection.

5. The relay valve module of claim 4, wherein the outlet valve has a first outlet valve connection, which is connected to the second inlet valve connection, a second outlet valve connection, which is connected to the pilot control pressure line, and a third outlet valve connection.

6. The relay valve module of claim 3, wherein the outlet valve has a first outlet valve connection, which is connected to a vent, a second outlet valve connection, which is connected to the pilot control pressure line, and a third outlet valve connection.

7. The relay valve module of claim 6, wherein the third inlet valve connection is connected to the third outlet valve connection.

8. The relay valve module of claim 1, further comprising:
a pressure sensor configured to detect the service brake pressure and provide a corresponding brake pressure signal.

9. The relay valve module of claim 1, wherein the relay valve module comprises an axle modulator comprising a front axle modulator, and
wherein the first service brake connection is provided for a first vehicle side, and
wherein the relay valve module further comprises a second service brake connection, which is connected to the relay valve working connection, configured to output the service brake pressure for a second vehicle side.

10. The relay valve module of claim 9, further comprising:
a first ABS inlet valve and a second ABS inlet valve; and
a first ABS outlet valve and a second ABS outlet valve for at least one wheel brake cylinder of each side of the vehicle axle,
wherein each of the ABS inlet and outlet valves comprises a pressure-controlled diaphragm valve with an associated pilot control valve,
wherein each pilot control valve comprises a cyclically controllable 3/2 directional valves by which in each case one control pressure chamber of an associated diaphragm valve is selectively chargeable with service brake pressure or with control pressure picked off at the relay valve control connection of the relay valve or with ambient pressure.

11. The relay valve module of claim 1, wherein the relay valve module comprises a trailer control module,
wherein the first service brake connection is configured to connect to a trailer control connection, and
wherein the relay valve module further comprises a trailer supply connection configured to connect to a trailer supply pressure connection to supply reservoir pressure to a trailer.

12. The relay valve module of claim 11, wherein a rapid ventilation valve is connected to the trailer supply connection.

13. The relay valve module of claim 11, wherein a further shuttle valve is connected to the brake control pressure connection, which further shuttle valve outputs to the brake control pressure connection the respectively higher of the brake control pressure and an anti jackknifing brake pressure.

14. An electronically controllable pneumatic brake system, comprising:
a front axle modulator comprising the relay valve module of claim 1, the first service brake connection being provided for a first vehicle side, the relay valve module further comprising a second service brake connection, which is connected to the relay valve working connection, configured to output the service brake pressure for a second vehicle side;
a trailer control module comprising the relay valve module of claim 1, the first service brake connection being configured to connect to a trailer control connection, the relay valve module further comprising a trailer supply connection configured to connect to a trailer supply pressure connection to supply reservoir pressure to a trailer;
a brake transducer with at least one pneumatic brake transducer connection and one electric brake transducer connection;
a central module; and
a rear axle modulator,
wherein the at least one pneumatic brake transducer connection is connected to the brake control pressure connection of the front axle modulator and/or to the brake control pressure connection of the trailer control module, and
wherein the electric brake transducer connection is connected to the central module.

15. A utility vehicle, comprising:
the electronically controllable pneumatic brake system of claim 14.

16. A method for providing an axle modulator or a trailer control module, the method comprising:
providing a relay valve module for an electronically controllable pneumatic brake system for actuating wheel brakes of a utility vehicle, the relay valve module comprising:
a reservoir connection configured to receive a reservoir pressure;
a brake control pressure connection configured to receive a brake control pressure;
at least one first service brake connection configured to output a service brake pressure;
a relay valve with a relay valve reservoir connection, which is connected to the reservoir connection, a relay valve working connection, which is connected to the first service brake connection, a relay valve ventilation connection, and a relay valve control connection;
an electropneumatic pilot control unit, which is connected to the reservoir connection, the electropneumatic pilot control unit being configured to provide a pilot control pressure; and
a shuttle valve with a first shuttle valve inlet, a second shuttle valve inlet, and a shuttle valve outlet,
wherein the first shuttle valve inlet is connected to the brake control pressure connection to receive the brake control pressure, the second shuttle valve inlet is connected to the pilot control unit to receive the pilot control pressure, and the shuttle valve outlet is connected to the relay valve control connection to output to the relay valve control connection the respectively higher of the brake control pressure or the pilot control pressure; and a) providing a second service brake connection for outputting the service brake pressure for a second vehicle side, or b) providing a trailer supply connection which is provided for connecting to a trailer supply pressure connection, to supply reservoir pressure to a trailer.

* * * * *